United States Patent [19]

Pruckmayr et al.

[11] Patent Number: 5,284,980
[45] Date of Patent: Feb. 8, 1994

[54] BLOCK COPOLYETHERS VIA OXONIUM COUPLING OF POLY(TETRAMETHYLENE ETHER) GLYCOLS

[75] Inventors: Gerfried Pruckmayr, Media, Pa.; Robert B. Osborne, North Tonawanda, N.Y.

[73] Assignee: E. I. du Pont de Nemours and Company, Wilmington, Del.

[21] Appl. No.: 965,599

[22] Filed: Oct. 26, 1992

[51] Int. Cl.$^5$ ............................................. C07C 41/09
[52] U.S. Cl. ................................. 568/617; 568/608; 525/410; 549/429
[58] Field of Search .......................................... 568/617

[56] References Cited

U.S. PATENT DOCUMENTS 3,928,483 1/1975 Chang et al. ......................... 568/698

Primary Examiner—Howard T. Mars
Attorney, Agent, or Firm—Charles E. Feeny

[57] ABSTRACT

Treatment of poly(tetramethylene ether) glycols with acid catalysts at elevated temperatures leads to a chain coupling with rapid increase in molecular weight. Various alcohols including diols and triols can be incorporated into poly(tetramethylene ether) glycol backbone with modified properties and performance.

5 Claims, No Drawings

BLOCK COPOLYETHERS VIA OXONIUM COUPLING OF POLY(TETRAMETHYLENE ETHER) GLYCOLS

BACKGROUND OF THE INVENTION

1. Field of the Invention

The present invention relates to modification of poly(tetramethylene ether) glycols (PTMEG) to improve low temperature flexibility, alter hydrophilic/hydrophobic character, and affect water vapor transmission of the final polymers including polyurethanes, polyureas, polyurethane ureas and polyetheresters made by incorporating the modified PTMEG. In addition, the modified poly(tetramethylene ether) glycols have lower melting points and lower viscosity than PTMEG of corresponding molecular weight, thus making easier handling of these materials in their manufacture and further reactions.

2. Prior Art

Treatment of PTMEG with acid at elevated temperatures is known to lead to depolymerization of the PTMEG with formation of tetrahydrofuran (THF) (P. Dreyfuss, "Poly(Tetrahydrofuran), Gordon & Breach, New York, 1982; U.S. Pat. No. 3,925,484, M. C. Baker, to Du Pont).

DETAILED DESCRIPTION OF THE INVENTION

The present invention relates to a process for the manufacture of poly(tetramethylene ether) block copolymers via a coupling reaction of poly(tetramethylene ether glycol) blocks and hydroxy compounds. This coupling reaction proceeds through the formation of tertiary oxonium ions which are generated in a poly(tetramethylene ether) glycol depolymerization step in the presence of appropriate catalyst.

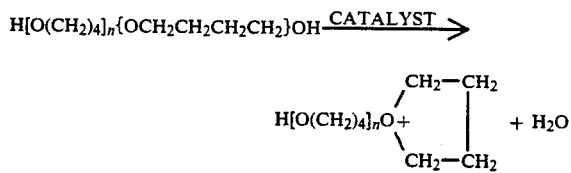

The tertiary oxonium ions react rapidly with the hydroxyl group of alcohols, diols, triols, etc. resulting in a substituted PTMEG:

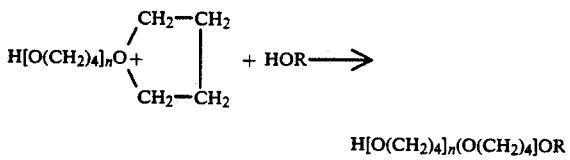

where R=alkyl, aryl, hydroxyalkyl, hydroxypolyether, hydroxyaryl, dihydroxyalkyl, polyhydroxycyclic, etc.

A repetition of this process can give rise to PTMEG chains coupled via diols, triols, etc.

The oxonium ions may be generated on one or both ends of the PTMEG molecules, and can either split off tetrahydrofuran (THF) to shorten the polyether chain yielding another tertiary oxonium ion or undergo termination with reactive hydrogens such as are present in diols, triols, etc. to give coupling modification products with di, tri-, etc. hydroxyl functionality desired as soft segments for polyurethane, polyurethane urea and polyetherester elastomers. The coupling modified products may contain, in addition to the PTMEG moiety, segments derived from ethylene glycol, diethylene glycol, triethylene glycol, polyethylene glycol, 1,3-propanediol, 2,2-dimethyl-1,3-propanediol, 1,4-butanediol, 1,8-octanediol, or 1,10-n-decanediol for example and retain two terminal hydroxyl groups on the linear chain. Substitution of trimethylol propane or glycerin for a difunctional glycol leads to a trifunctional polyether.

In accordance with the present invention, the coupling modification of PTMEG may be carried out by the following general batch procedure: The PTMEG and from 0.1 to 20 weight percent, based on PTMEG of a polyol containing 2 to 40 carbon atoms and 2 to 6 hydroxyl groups such as a diol (triol or other suitable coupling agent to be incorporated) are heated with the strong acid catalyst, e.g. sulfuric acid, preferably under an inert gas purge, to 90° to 150° C. for about 0.5 to 8 hours, optionally under reduced pressure of about 1 to 150 mmHg and preferably 10 to 120 mmHg, to provide for efficient removal of water to maintain an anhydrous reaction environment.

Examples of such strong acid catalysts are e.g. any sulfur or phosphorus containing acids and any acids which are capable of generating tertiary oxionium ions under the reaction conditions. Under the conditions of this coupling reaction, esters of the acid catalyst may form as by products, e.g. organic sulfate esters, if the catalyst is sulfuric acid. These esters have to be cleaved in a product purification procedure.

The lower threshold for the formation of block copolyethers via oxonium coupling poly(tetramethylene ether) glycols with other diols, triols and polyols is a reaction temperature of about 85° C. Excessive decomposition takes place at temperatures above 150° C. The preferred temperature range is 100° C.-150° C., while the most preferred range is 120°-145° C. The starting mixture is commonly nitrogen-purged before acid addition.

After the reaction mixture has reached a predetermined stage of coupling, as determined e.g. by viscosity or other analytical technique, (GPC) the condensation reaction is quenched by adding water. It is then heated under reflux for about one hour to hydrolyze any esters. The aqueous phase is then separated, and the polyether phase is neutralized by addition of a base, e.g. calcium hydroxide. This is followed by drying the polyether at 120° C. under vacuum (1 mm Hg) for at least 1 hour. Finally, the dried polyether is filtered through Celite Filter Aid to yield clear to light yellow copolyether diol (or polyol, etc.).

The coupling modification process can also be carried out in a series of continuous reactors:

The first reactor is fitted with ports for introduction of PTMEG, the diol (or polyol, etc.), strong acid, and a nitrogen purge. This reactor is heated to 130° C., optionally under slightly reduced pressure, and evolved THF and water collected in a separate vessel.

The second reactor accepts the copolyether sulfate ester from the first reactor, adds water at a rate to match the hold-up time for hydrolysis of the reaction product as it is held at reflux.

The effluent from the second reactor is sent to a separator where the aqueous layer is removed, and the copolyether phase is fed to a third reactor.

In the third reactor the copolyether phase is neutralized with base (such as calcium hydroxide) and the copolyether is dried at 120° C. under 1 mm Hg for a hold-up time of at least one hour. The effluent from this vessel is filtered, preferably through diatomaceous earth filter aid to give the final product.

The starting PTMEG used in the present invention generally has a number average molecular weight of 200 to 3,500. The product block copolymer generally has a number average molecular weight of 110% to 600% that of the PTMEG starting material.

The novel process of the present invention starts with PTMEG at temperatures well above 82.5° C., the ceiling temperature at which no polymerization of THF to PTMEG takes place, to initiate catalytic depolymerization of a small fraction of the PTMEG to THF and water while creating a corresponding number of tertiary oxonium ions on the PTMEG residue. The tertiary oxonium species react rapidly with diols or polyols to increase the overall molecular weight yielding the modified segmented end or block structures. These novel PTMEG modifications find applications as elastomeric soft segments in the manufacture of high performance polyurethanes, polyurethane ureas, polyetheresters, and polyureas. The polyurethanes made from the block copolymers of the present invention and aromatic diisocyanates, cured with diol or diamine chain extenders.

EXAMPLE 1

A glass reaction vessel was charged with a mixture of 200 g of TERATHANE® 650 poly(tetramethylene ether) glycol (PTMEG of 650 number average molecular weight, Du Pont Co.), and 20 g of ethylene glycol. To this was slowly added 4 g of concentrated (96%) sulfuric acid. This mixture was stirred and heated to 125° C. under slightly reduced pressure (120 mm of Hg) for 1 hour. The collected distillates weighing 67 g contained 12% water in THF. At this point, the reaction was quenched by addition of 50 ml of water, and the polyether ester was hydrolyzed by heating under reflux for 1 hours. After cooling, the aqueous bottom phase was removed, and the polyether phase was neutralized by addition of 6 g of calcium hydroxide. The copolyether was then dried at 120° C. under reduced pressure (1 mm Hg) for 1 hour and filtered through a layer of Celite Filter Aid. The clear, colorless final copolyether glycol recovered weighed 155 g and was characterized as follows:

| Number average molecular weight | 1840 |
|---|---|
| Molecular weight ratio | 1.87 |
| Viscosity at 40° C. | 9.08 poise |
| Oxyethylene content (by NMR) | 12 · mole % |

For comparison, commercial PTMEG of 2000 number average molecular weight has a viscosity of 12.0 poise at 40° C.

EXAMPLE 2

A glass reaction vessel equipped with a rotary stirrer, a heating mantle, a distillate takeoff and a nitrogen purge was charged with 400 g TERATHANE® 650 (Du Pont Co. PTMEG of 650 number average molecular weight), and 120 g of polyethylene glycol (PEG 200) with a number average molecular weight of 200. To this polyether blend was added 10 g of 96% sulfuric acid in 20 g of tetrahydrofuran. The homogenous solution was heated to 120° C. g of tetrahydrofuran. The homogenous solution was heated to 120° C. under reduced pressure of 10 mm of Hg, and the distillate consisting of water and THF was collected in a cooled receiver.

The coupling reaction was monitored by checking the viscosity increase. After about 3 hours a viscosity of 8.5 poise (at 40° C.) was reached, and the reaction was quenched by addition of 600 g of water. About 50 ml of water was distilled off to insure hydrolysis of any residual sulfate ester. The reaction mass was transferred to a separatory funnel. Phase separation occurred at 80° C. The aqueous phase was separated and the polyether phase was made basic by addition of 3 g of calcium hydroxide. The neutralized block copolyether glycol was then dried at 120° C. under a reduced pressure of 1 mm Hg for 1 hour. Filtration through Celite Filter Aid yielded 320 g of clear block copolyether glycol characterized as follows:

| Number average molecular weight | 2050 |
|---|---|
| Molecular weight ratio | 1.50 |
| Viscosity at 40° C. | 7.23 poise |
| Oxyethylene content (by NMR) | 38.8 mole % |

For comparison unmodified PTMEG of 2000 number average molecular weight is characterized as follows:

| Number average molecular weight | 2000 |
|---|---|
| Molecular weight ratio | 2.0 |
| Viscosity at 40° C. | 12.0 poise |

EXAMPLE 3

In a glass reaction vessel 100 g of TERATHANE® 650 and 20 g of neopentyl glycol were mixed, and 4 g of 96% sulfuric acid in 20 g of THF were added. The mixture became homogenous on heating to 120° C. under reduced pressure (80 mm Hg) for about 2 hours. A distillate of water and THF weighing 66 g was collected. The reaction was then quenched by adding 150 ml water, heated to hydrolyze sulfate esters, and washed with an additional 150 ml of water. After neutralization with 1 g of calcium hydroxide, the copolyether glycol was dried under reduced pressure (1 mm Hg) at 120° C. After filtration through a bed of diatomaceous earth, 60 g of final copolyether glycol was recovered with the following characteristics:

| Number average molecular weight | 1045 |
|---|---|
| Oxy-2,2-dimethyl-propylene content (from neopentyl glycol) | 17.0 mole % |
| Copolyether glycol melt temperature | −9.3° to +10.0° C. |

Commercial PTMEG of 1000 number average molecular weight has a melt temperature of 33° C.

EXAMPLE 4

In a glass reaction vessel, equipped with mechanical stirrer, take-off condenser and temperature monitor, 560 grams of neopentylglycol and 3250 g of TERATHANE® 1000 are mixed and sparged for at least one hour with dry nitrogen. With vigorous stirring, 210 grams of 25% aqueous $H_2SO_4$ are then added as catalyst, and the reaction is initiated by heating the mixture to 135° C. while maintaining the nitrogen sparging.

As the reactions progresses, water and THF are collected in a receiver. During the 3-5 hour reaction time, a total of about 1600 ml of distillate are collected. The progress of the reaction can be followed by monitoring the viscosity, or by checking the molecular weight via gel permeation chromatography. When the desired molecular weight has been reached, the reaction is stopped by addition 1000 ml of hot water.

The hydrolysis is carried out under reflux at a pot temperature of 100° C. for one hour. An additional 500 ml of water is then and the reaction product is allowed to separate into two liquid phases. The lower aqueous is removed, and the polymer phase is neutralized with calcium hydroxide. The neutral product is dried at 120° C. under reduced pressure (15 mm Hg) and filtered.

The resulting Terathane block-copolymer has a number average molecular weight of 1880, and contained 23% of neopentyl glycol units. The copolymer had a crystalline melting point of below 0° C., while polytetramethylene glycol homopolymer of comparable molecular weight has a melt temperature of about 35° C.

EXAMPLE 5

Co-polyether glycols were prepared from PTMEG 650 with PEG 200 (EXAMPLE 5A), and from PTMEG 1000 with PEG 200 (EXAMPLE 5B) using the procedure described in EXAMPLE 2 above. The co-polyether glycols were found to have number average molecular weights of 2092 for EXAMPLE 5A and 2050 for EXAMPLE 5B. Commercial TERATHANE® 2000 (EXAMPLE 5C) served as reference polyol.

A 2 liter flask fitted with an external heater, and internal temperature indicator, and stirrer was continually purged with dry nitrogen and used as a reaction vessel to convert the co-polyether glycols to polyurethanes.

EXAMPLE 5A and EXAMPLE 5C

The reaction vessel was charged with 1 mole (2092 g) of co-polyether glycol (EXAMPLE 5A) or (2036 g of TERATHANE® 2000 for EXAMPLE 5C) and 2 moles (180 g) of 1,4-butanediol and 0.02% Polycat 70, a commercially available polyurethane catalyst. The temperature of this mixture was maintained at 60° C., and the vessel was vacuum degassed and purged with dry nitrogen. Three moles (750 g) of melted MDI (methylene diphenyldiisocyanate) at 70° C. were then added. After thorough mixing, the reaction mass was poured at 95° C. into steel molds preheated to 140° C. The polyurethanes were cured 1 hour at 120° C., and post-cured for 16 hours at 100° C.

EXAMPLE 5B

EXAMPLE 5B employed no catalyst and used MDI and "TERATHANE" 1000/PEG 200 as the polyol in a 3.0 to 1.0 molar ratio to form a prepolymer. The polyol number average molecular weight was 2050, viscosity at 40° C. was 7.74 poise and oxyethylene content by NMR was 35 mole percent. 1,4-butanediol (2.0 moles) was used as the chain extender for the final polyurethane. The curing regimen was the same as for EXAMPLE 5A and EXAMPLE 5C.

| Physical Test Data of Polyurethanes | | | |
|---|---|---|---|
| | EXAMPLE 5A Mn 2092 | EXAMPLE 5B Mn 2050 | EXAMPLE 5C Mn 2036 |
| Hardness, A Scale | 76 | 65 | 85 |
| D Scale | 24 | 22 | 35 |
| 100% modulus, psi | 489 | 336 | 766 |
| 300% Modulus, psi | 727 | 623 | 1377 |
| Elongation, % at break | 330 | 493 | 623 |
| Tensile strength at break, psi | 751 | 1054 | 3828 |
| Water Vapor Transmission g/100 Sq. in./24 hrs. | 4.82 | | 3.18 |
| % Volume Increase in 1 week at 70° C. in: | | | |
| ASTM #1 Oil | 1.90 | 0.66 | 3.94 |
| ASTM #3 Oil | 31.88 | 28.66 | 38.41 |

The greater water vapor transmission of the EXAMPLE 5A and the improved resistance to swelling in hot oils of both EXAMPLE 5A and EXAMPLE 5B over the unmodified EXAMPLE 5C are regarded as valuable assets for certain end use applications such as seals.

We claim:

1. A process for preparing block copolymers comprising:
   (a) treating a poly(tetramethylene ether) glycol having a number average molecular weight of 200 to 3,500 at a temperature of 90° to 150° C. for 0.5 to 8 hours with a catalytic amount of a strong acid and from 0.1 to 20 percent by weight, based on poly(tetramethylene ether) glycol, of a polyol containing 2 to 40 carbon atoms and 2 to 6 hydroxyl groups, while distilling off water and tetrahydrofuran,
   (b) hydrolyzing any intermediate polyol esters present to the corresponding polyether polyols,
   (c) separating the organic phase from the aqueous phase,
   (d) neutralizing the polyol phase,
   (e) recovering a polyether polyol comprising blocks of poly(tetramethylene ether) and blocks derived from said polyol.

2. The process of claim 1 wherein the strong acid is 0.1 to 10 wt % sulfuric acid of 10 to 98 wt % concentration.

3. The process of claim 2 wherein from 1 to 5 wt % sulfuric acid is present, based on poly(tetramethylene ether) glycol starting material.

4. The process of claim 3 wherein the tetrahydrofuran is distilled off under nitrogen purge or at a pressure of 1 to 760 mm Hg.

5. The process of claim 2 wherein the temperature is from 110° to 145° C.

* * * * *